(12) United States Patent
Itou et al.

(10) Patent No.: US 8,836,466 B2
(45) Date of Patent: Sep. 16, 2014

(54) MONITORING SYSTEM, DEVICE, MONITORING METHOD, AND MONITORING PROGRAM

(75) Inventors: Yutaka Itou, Kawasaki (JP); Makoto Ikeyama, Kawasaki (JP); Yasushi Nakagawa, Kawasaki (JP); Yuji Aoki, Kawasaki (JP); Atsushi Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 13/193,754

(22) Filed: Jul. 29, 2011

(65) Prior Publication Data

US 2012/0033757 A1 Feb. 9, 2012

(30) Foreign Application Priority Data

Aug. 4, 2010 (JP) ................................. 2010-175723

(51) Int. Cl.
  *G05B 23/02* (2006.01)
  *H04L 27/00* (2006.01)
  *G06F 15/16* (2006.01)
  *H04L 12/24* (2006.01)
(52) U.S. Cl.
  CPC .......... *H04L 41/0686* (2013.01); *H04L 41/069* (2013.01)
  USPC .............................. 340/3.1; 375/295; 709/206
(58) Field of Classification Search
  USPC ...................... 375/295–315; 340/3.1; 709/206
  See application file for complete search history.

(56) References Cited

U.S. PATENT DOCUMENTS

| | | | | |
|---|---|---|---|---|
| 6,807,233 | B1 * | 10/2004 | Sato et al. ...................... | 375/259 |
| 6,909,758 | B2 * | 6/2005 | Ramesh et al. ............... | 375/340 |
| 8,635,287 | B1 * | 1/2014 | Shih et al. ...................... | 709/206 |
| 2005/0254610 | A1 * | 11/2005 | Liu et al. ....................... | 375/354 |

FOREIGN PATENT DOCUMENTS

JP  7-244620  9/1995

* cited by examiner

*Primary Examiner* — Daniel Wu
*Assistant Examiner* — Mohamed Barakat
(74) *Attorney, Agent, or Firm* — Staas & Halsey LLP

(57) ABSTRACT

In a monitoring system, a first device among devices includes a generating unit that generates third data indicating a string of an identical section when strings each indicated in first data and second data acquired through communications with the devices are identical to each other by a predetermined proportion or more, and a first transmitting unit that transmits the third data generated by the generating unit and information for identifying the third data to a second device included in the devices. The second device includes a second transmitting unit that transmits, when a string indicated in fourth data to be transmitted to the first device includes the string indicated in the third data, fifth data indicating a string obtained by excluding the string indicated in the third data from the string indicated in the fourth data, and the information for identifying the third data to the first device.

4 Claims, 12 Drawing Sheets

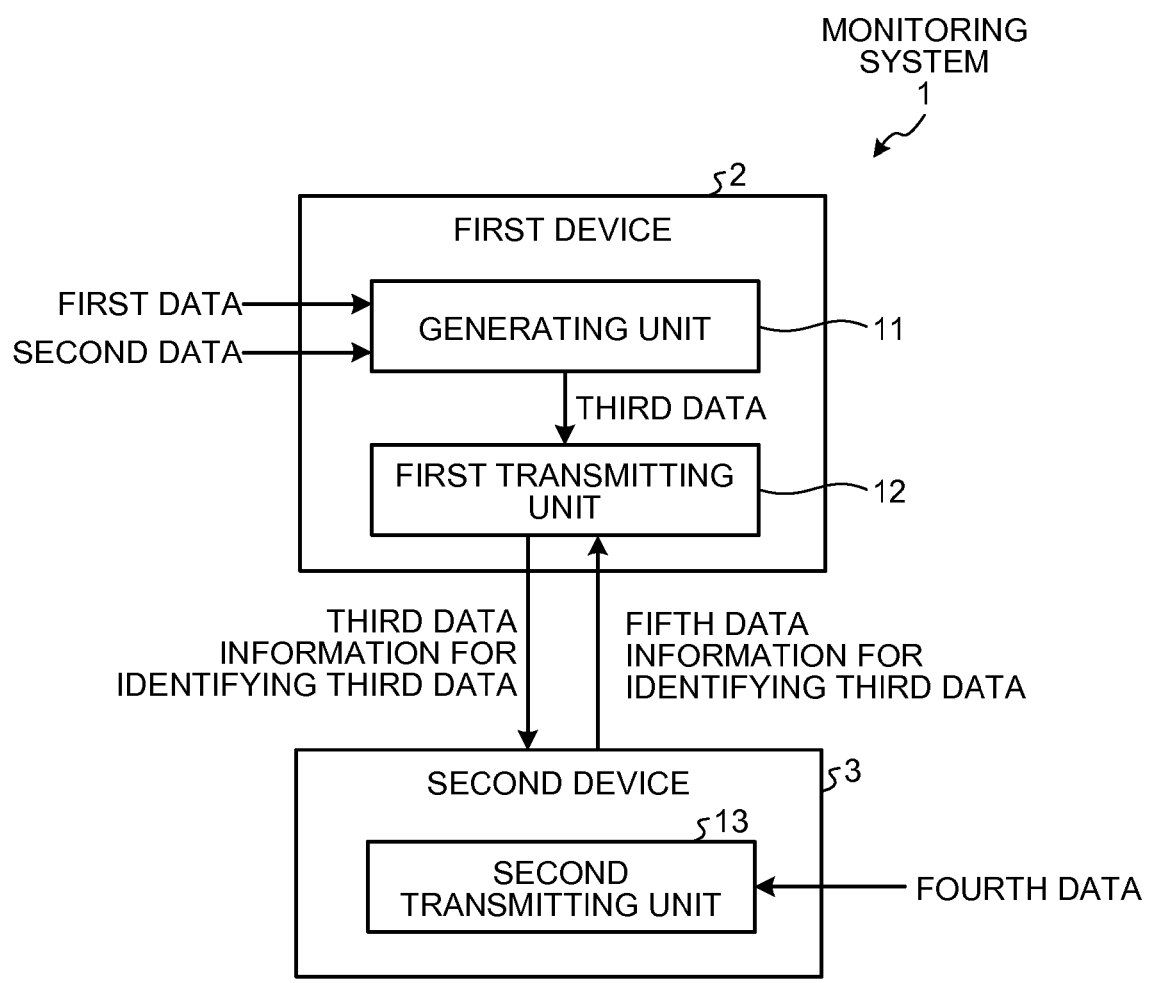

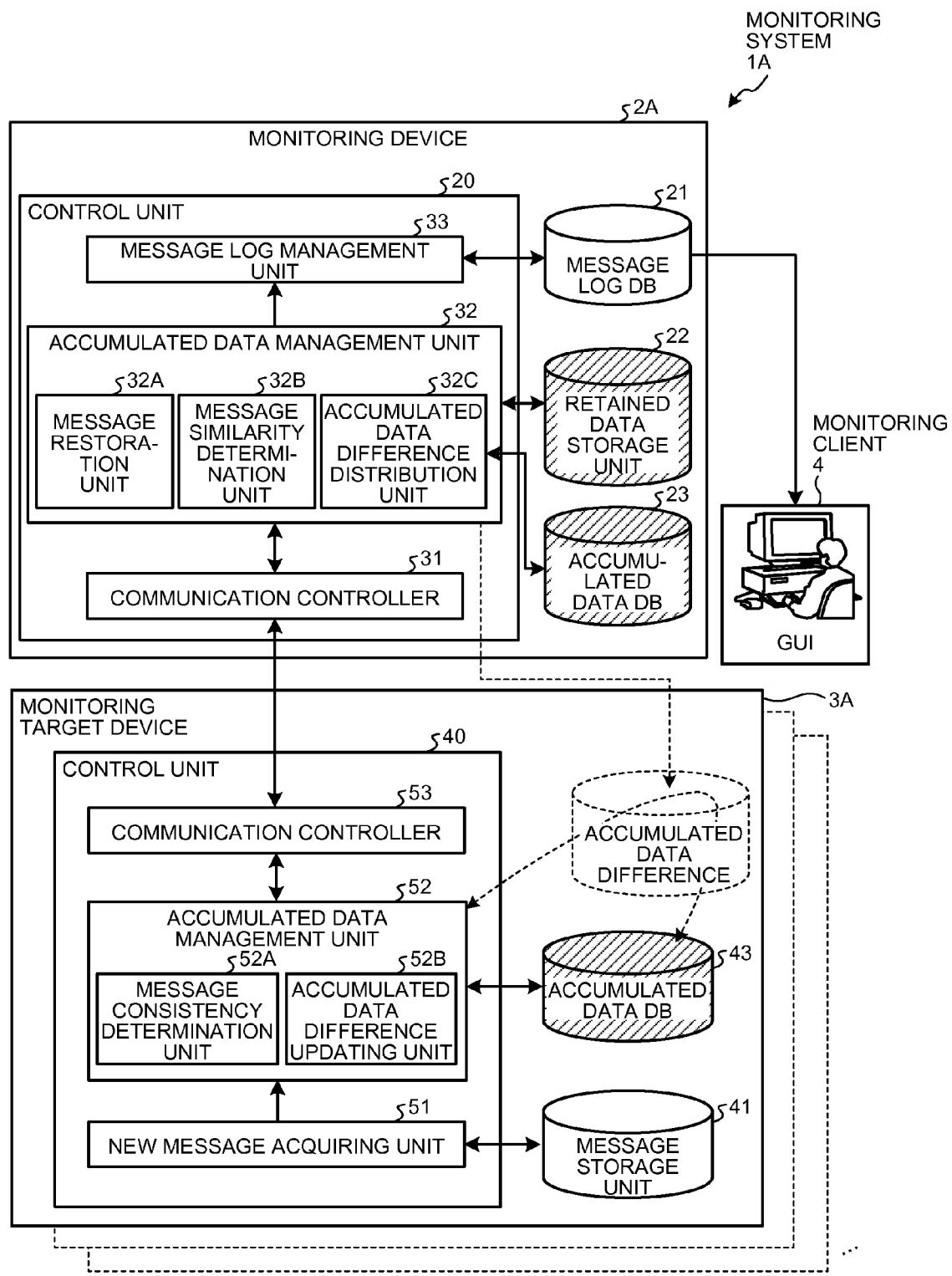

FIG.3

| | 43a | 43b | 43c T1 | 43 |
|---|---|---|---|---|
| | ACCUMU-LATED DATA ID | GENER-ATION SOURCE HOST NAME | FIXED MESSAGE | |
| | 1 | HOST A | REFLECTION PROCESSING OF %%1%% FILES (INSIDE OF %%2%%) IS INTERRUPTED BECAUSE FORMAT VIOLATION IS DETECTED IN FILE ANALYSIS PROCESSING | |
| | 2 | HOST A | SERVICE (%%1%%) HAS BEEN STARTED | |
| | ⋮ | ⋮ | ⋮ | |

| | 1a | 1b | 1c | 1d |
|---|---|---|---|---|
| 0x0000 | ENTIRE DATA LENGTH | DATA TYPE (0x04) | HOST NAME OFFSET | MESSAGE OFFSET |
| 1e | HOST NAME | | | |
| 1f | MESSAGE | | | |

FIG.4B

| | 2a | 2b | 2f 2c | 2d |
|---|---|---|---|---|
| 0x0000 | ENTIRE DATA LENGTH | DATA TYPE (0x01) | ACCUMULATED DATA ID | HOST NAME OFFSET |
| 0x0010 | PARAMETER NUMBER | PARAMETER 1 OFFSET | PARAMETER 2 OFFSET | ... |
| 2e | HOST NAME | | | |
| 2g | PARAMETER 1 | | | |
| 2h | PARAMETER 2 | | | |

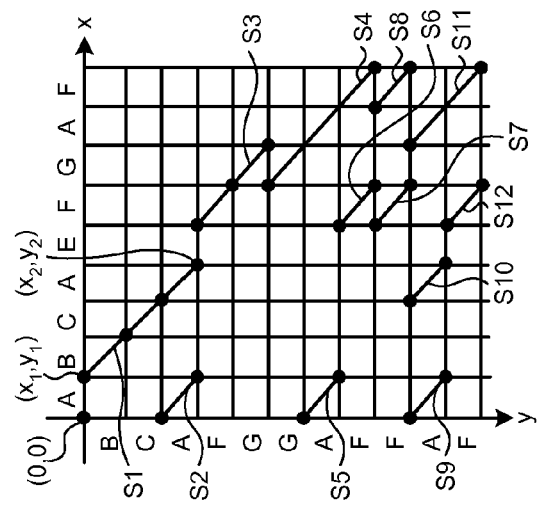

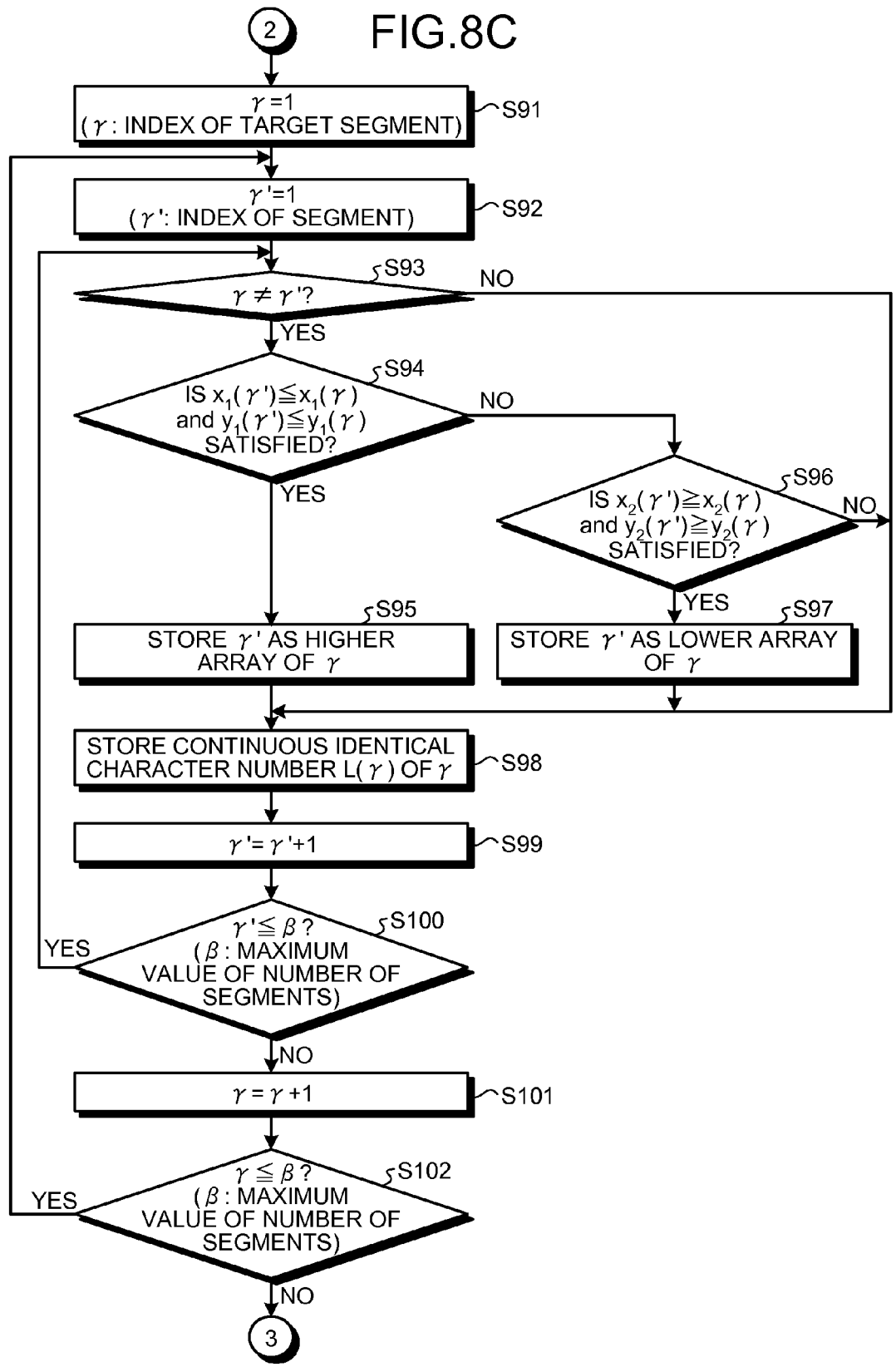

MONITORING SYSTEM, DEVICE, MONITORING METHOD, AND MONITORING PROGRAM

CROSS-REFERENCE TO RELATED APPLICATION

This application is based upon and claims the benefit of priority of the prior Japanese Patent Application No. 2010-175723, filed on Aug. 4, 2010, the entire contents of which are incorporated herein by reference.

FIELD

The embodiments discussed herein are directed to a monitoring system, a device, a monitoring method, and a monitoring program.

BACKGROUND

Conventionally, in a monitoring system that performs monitoring by a message related to an abnormality or other statuses of a device, a monitoring target device transmits the full text of the message to a monitoring device, and the monitoring device to which the message has been transmitted uses the message to monitor the monitoring target device.

In another example of the transmittance of a message related to an abnormality, the monitoring target device stores a message having been transmitted as a processed message including a message ID in a learning table. When a new abnormality occurs in the monitoring target device, the monitoring target device examines whether a message identical to the message related to the abnormality is among message IDs stored in the learning table. If the identical message is stored therein, the monitoring target device determines consistency between the new message and the message in the learning table for each section, and transmits inconsistent sections together with the message ID to the monitoring device.

However, in the monitoring system disclosed in Japanese Laid-open Patent Publication No. 07-244620, for example, the consistency between the new message and the processed message is determined by using the message ID as a key. Therefore, in a monitoring system that requires no message ID, the monitoring target device transmits the full text of the new message to the monitoring device. This increases the network load. Note that monitoring systems that require no message ID include an open system whose operation system (OS) is UNIX (registered trademark), for example.

Furthermore, in a monitoring system that requires message IDs as in the related art, even if the new message and the processed message are almost identical to each other, the monitoring target device may not determine that these messages are identical when their message IDs are different from each other. As a result, even when the messages are almost identical to each other, the monitoring target device transmits the full text of the new message to the monitoring device, resulting in an increase in the network load.

SUMMARY

According to an aspect of an embodiment of the invention, a monitoring system includes a first device and a second device. The first device among a plurality of devices includes a generating unit that, when strings each indicated in first data and second data acquired through communications with the plurality of devices are identical to each other by a predetermined proportion or more, generates third data indicating a string of an identical section of the first data and the second data; and a first transmitting unit that transmits the third data and information for identifying the third data to a second device included in the plurality of devices. The second device includes a second transmitting unit that, when a string indicated in fourth data to be transmitted to the first device includes the string indicated in the third data, transmits fifth data indicating a string obtained by excluding the string indicated in the third data from the string indicated in the fourth data, and the information for identifying the third data to the first device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a functional block diagram of a configuration of a monitoring system according to a first embodiment;

FIG. 2 is a functional block diagram of a configuration of a monitoring system according to a second embodiment;

FIG. 3 is an example diagram of a data structure of an accumulated data DB;

FIGS. 4A and 4B are example diagrams of a data structure of transmission data;

FIGS. 7A to 7F are diagrams for explaining a concept of calculation processing of the number of identical characters between strings;

FIG. 8C is a flowchart illustrating a processing process for generating a relational table between the segments;

DESCRIPTION OF EMBODIMENTS

Figure 5:
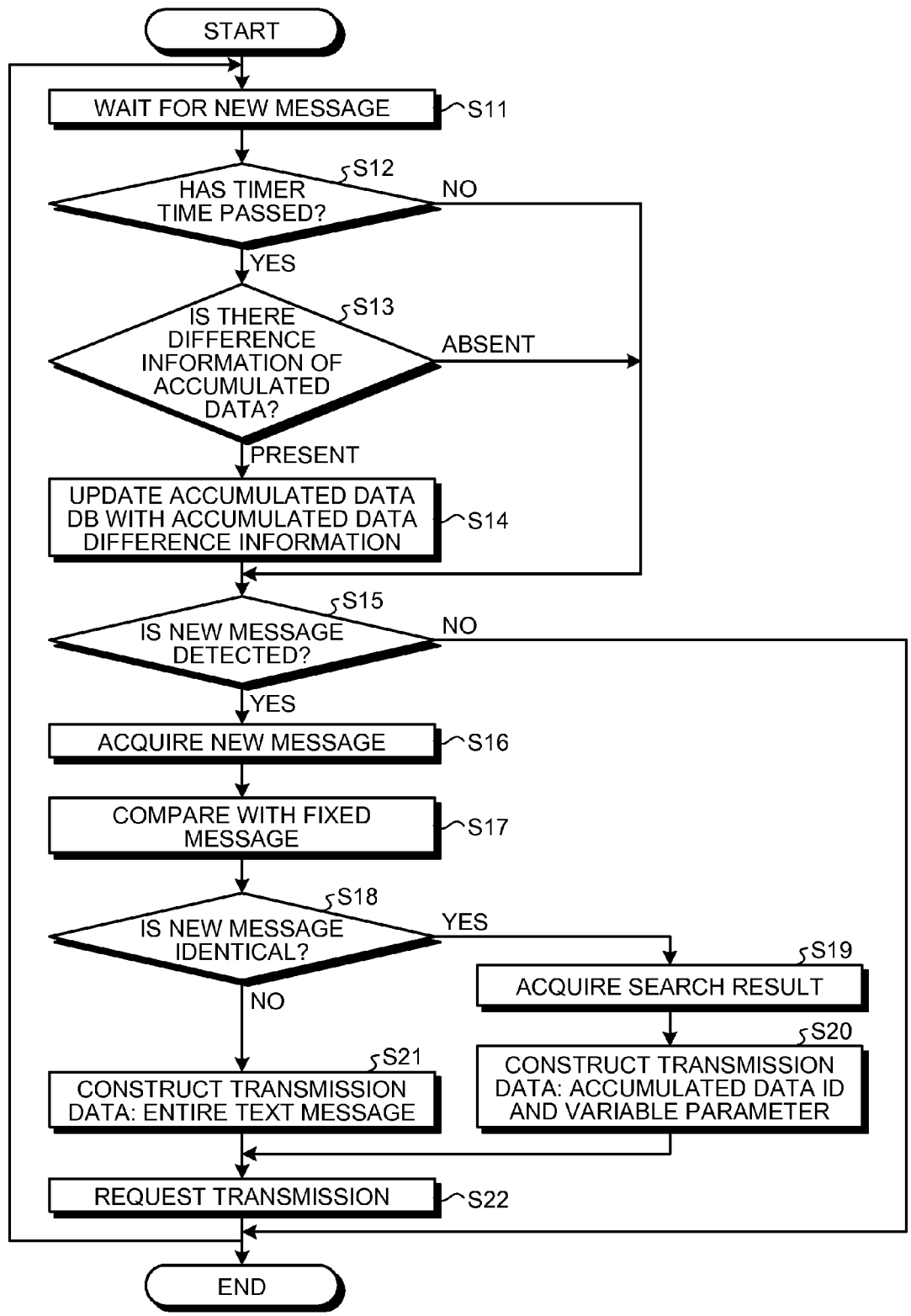
FIG. 5 is a flowchart illustrating a processing process of a monitoring target device according to the second embodiment.

Preferred embodiments of the present invention will be explained with reference to accompanying drawings. It is to be noted that the embodiments are not intended to limit the present invention.

First Embodiment

FIG. 1 is a functional block diagram of a configuration of a monitoring system according to a first embodiment. As illustrated in FIG. 1, a monitoring system 1 has a plurality of devices including a first device 2 and a second device 3. The first device 2 includes a generating unit 11 and a first transmitting unit 12. The second device 3 includes a second transmitting unit 13.

When strings each indicated in first data and second data acquired through communications with the plurality of devices are identical to each other by a predetermined proportion or more, the generating unit 11 of the first device 2 generates third data indicating a string of the identical section. The first transmitting unit 12 of the first device 2 transmits the third data generated by the generating unit 11, and information for identifying the third data to the plurality of devices including the second device 3.

When a string indicated in fourth data includes the string indicated in the third data, the second transmitting unit 13 of the second device 3 transmits fifth data indicating a string obtained by excluding the string indicated in the third data from the string indicated in the fourth data, and the information for identifying the third data to the first device 2.

In this manner, in the monitoring system 1, the first device 2 transmits a third string indicating the string of the section in which the strings each indicated in the first data and the second data are identical to each other by the predetermined proportion or more, and identification information of the third string to the plurality of devices including the second device 3. Therefore, the second device 3 uses the third string transmitted from the first device 2 for comparison with a string indicated in new data. This allows the second device 3 to transmit difference between the fourth data and the third string, and the identification information of the third string to the first device 2 as the fourth data serving as the new data. As a result, in the monitoring system 1, the traffic amount of the third data included in the fourth data serving as the new data transmitted from the second device 3 to the first device 2 can be reduced to the traffic amount of the identification information of the third data, thereby making it possible to perform monitoring without putting a load on the network.

Configuration of a Monitoring System According to a Second Embodiment

FIG. 2 is a functional block diagram of a configuration of a monitoring system according to a second embodiment. As illustrated in FIG. 2, a monitoring system 1A includes a monitoring device 2A and a plurality of monitoring target devices 3A. The monitoring device 2A is connected to the plurality of monitoring target devices 3A, and manages messages transmitted by the monitoring target devices 3A. The monitoring device 2A is also connected to a monitoring client 4. The monitoring client 4 displays the messages from the monitoring target devices 3A on a monitor, for example, using a graphical user interface (GUI), thereby monitoring an abnormality of the monitoring target devices 3A. As for the message from the monitoring target device, a message indicating an abnormality of the monitoring target device 3A is assumed, for example. Examples of the abnormality of the monitoring target device 3A may include an abnormality caused by malfunction of the monitoring target device 3A and a communication abnormality.

The monitoring device 2A includes a control unit 20, a message log DB 21, a retained data storage unit 22, and an accumulated data DB 23. The monitoring target device 3A connected to the monitoring device 2A includes a control unit 40, a message storage unit 41, and an accumulated data DB 43.

The control unit 40 of the monitoring target device 3A transmits a new message to the monitoring device 2A so as to cause the monitoring device 2A to manage the message. The control unit 40 includes a new message acquiring unit 51, an accumulated data management unit 52, and a communication controller 53. Note that the control unit 40 is an integrated circuit such as an application specific integrated circuit (ASIC), and a field programmable gate array (FPGA), or an electronic circuit such as a central processing unit (CPU), and a micro processing unit (MPU), for example.

The new message acquiring unit 51 acquires a new message. Specifically, the new message acquiring unit 51 monitors a new message retained in the message storage unit 41, and acquires the new message retained in the message storage unit 41. The message storage unit 41 stores therein messages including a system log and an application log related to an abnormality of the device itself. Note that the message storage unit 41 is a semiconductor memory device such as a random access memory (RAM) and a flash memory, or a storage device such as a hard disk and an optical disk, for example.

The accumulated data management unit 52 manages accumulated data, and uses the accumulated data thus managed to create transmission data to be transmitted to the monitoring device 2A from a new message. The accumulated data management unit 52 includes a message consistency determination unit 52A, and an accumulated data difference updating unit 52B. The message consistency determination unit 52A determines whether the new message acquired by the new message acquiring unit 51 includes the message accumulated in the accumulated data DB 43. The accumulated data DB 43 will now be explained with reference to FIG. 3.

FIG. 3 is an example diagram of a data structure of the accumulated data DB 43. As illustrated in FIG. 3, the accumulated data DB 43 stores therein a generation source host name 43b and a fixed message 43c in association with each accumulated data ID 43a. The data included in a record for each accumulated data ID 43a is referred to as "accumulated data".

The accumulated data ID 43a is an identification number assigned to each fixed message 43c uniquely. The generation source host name 43b is a name of the monitoring target device 3A that is a generation source of a message. The fixed message 43c is a string obtained by separating the message into a variable section and an invariable section. The variable section is a section that is variable, such as a number, a string in parenthesis, a blank, a tub, a date, and a string after ":" or "=", and is represented as a parameter. Note that a character in the variable section is referred to as a "specific character". In the example of FIG. 3, in the fixed message 43c of which accumulated data ID 43a is "1", the section of a number is converted into a parameter as a specific character (T1). By contrast, in the fixed message 43c of which accumulated data ID 43a is "2", the section of the string in parenthesis is converted into a parameter as a specific character (T2). The data in the accumulated data DB 43 is each created by a message similarity determination unit 32B of the monitoring device 2A, which will be described later.

Referring back to FIG. 2, specifically, the message consistency determination unit 52A creates a string obtained by excluding the parameter represented as the specific character from the fixed message 43c stored in the accumulated data DB 43. The message consistency determination unit 52A then determines whether the string indicated in the new message includes the string created from the fixed message 43c.

If the message consistency determination unit 52A determines that the string indicated in the new message includes the string created from the fixed message 43c, the message consistency determination unit 52A determines that the messages are identical to each other. The message consistency determination unit 52A then extracts difference between the string indicated in the new message and the string created from the fixed message 43c. In other words, the message consistency determination unit 52A extracts the specific character corresponding to the parameter indicated in the fixed message 43c from the string indicated in the new message. Subsequently, the message consistency determination unit 52A outputs the specific character corresponding to the parameter thus extracted, and the accumulated data ID 43a in association with the fixed message 43c to the communication controller 53 as transmission data.

By contrast, if the message consistency determination unit 52A determines that the string indicated in the new message does not include the string created from the fixed message 43c, the message consistency determination unit 52A determines that the messages are not identical to each other. The message consistency determination unit 52A then outputs the string itself indicated in the new message to the communication controller 53 as transmission data.

The data structure of the transmission data will now be explained with reference to FIGS. 4A and 4B. FIGS. 4A and 4B are example diagrams of the data structure of the transmission data. FIG. 4A illustrates the data structure of the transmission data when the accumulated data DB 43 has no accumulated data, or when the string indicated in the new message does not include the string created from the fixed message 43c. FIG. 4B illustrates the data structure of the transmission data when the accumulated data DB 43 has accumulated data, and the string indicated in the new message includes the string created from the fixed message 43c.

As illustrated in FIG. 4A, the transmission data when the accumulated data DB 43 has no accumulated data includes an entire data length 1a, a data type 1b, a host name offset 1c, a message offset 1d, a host name 1e, and a message 1f. The entire data length 1a represents the entire data length of the transmission data. The data type 1b represents a value indicating that the data to be transmitted is the string itself indicated in the message. The value used herein is "0x04". The host name offset 1c represents a specified position from the beginning of the transmission data for a host name, which will be described later. The message offset 1d represents a specified position from the beginning of the transmission data for a message, which will be described later. The host name 1e represents a host name that is a generation source of the message. In other words, the host name of the device itself is set to the host name 1e. The message itself is set to the message 1f.

As illustrated in FIG. 4B, the transmission data when the accumulated data DB 43 has accumulated data includes an entire data length 2a, a data type 2b, an accumulated data ID 2c, a host name offset 2d, a parameter number 2e, and a parameter offset 2f of the number of parameters. The transmission data further includes a host name 2g and a parameter 2h of the number of parameters. Because the entire data length 2a, the host name offset 2d, and the host name 2g correspond to the entire data length 1a, the host name offset 1c, and the host name 1e illustrated in FIG. 4A, respectively, the explanation thereof will be omitted. The data type 2b represents a value indicating that the data to be transmitted is the specific character and the accumulated data ID. The value used herein is "0x01". The accumulated data ID 43a in association with the fixed message 43c determined to be identical to the message is set to the accumulated data ID 2c. The parameter number 2e represents the number of parameters included in the fixed message 43c. The parameter offset 2f represents a specified position from the beginning of the transmission data for a parameter, which will be described later. The parameter 2h represents a specific character that corresponds to the parameter indicated in the fixed message 43c, and is extracted from the string indicated in the message.

Referring back to FIG. 2, the accumulated data difference updating unit 52B updates difference between the accumulated data DB 43 included in the device itself, and the accumulated data DB 23 included in the monitoring device 2A. Specifically, the accumulated data difference updating unit 52B acquires difference of the accumulated data distributed from the monitoring device 2A via the communication controller 53. The accumulated data difference updating unit 52B then updates the accumulated data DB 43 included in the device itself with the accumulated data thus acquired. In other words, the accumulated data difference updating unit 52B can make the content of the accumulated data DB 43 included in the device itself, and the content of the accumulated data DB 23 included in the monitoring device 2A identical to each other.

The communication controller 53 outputs the accumulated data transmitted from the monitoring device 2A to the accumulated data difference updating unit 52B. Furthermore, the communication controller 53 transmits the transmission data of the content requested from the message consistency determination unit 52A to the monitoring device 2A.

The control unit 20 of the monitoring device 2A manages the message from the monitoring target device 3A. The control unit 20 includes a communication controller 31, an accumulated data management unit 32, and a message log management unit 33. The accumulated data management unit 32 includes a message restoration unit 32A, the message similarity determination unit 32B, and an accumulated data difference distribution unit 32C. Note that the control unit 20 is an integrated circuit such as an ASIC, and an FPGA, or an electronic circuit such as a CPU, and an MPU, for example.

The communication controller 31 receives the transmission data transmitted from the monitoring target device 3A, and outputs the transmission data to the accumulated data management unit 32. Furthermore, the communication controller 31 transmits the accumulated data distributed by the accumulated data difference distribution unit 32C, which will be described later, to the monitoring target device 3A. The accumulated data distributed by the accumulated data difference distribution unit 32C is difference between the accumulated data DB 23 included in the device itself, and the accumulated data DB 43 included in the monitoring target device 3A.

If the transmission data includes the specific character and the accumulated data ID in association with the fixed message, the message restoration unit 32A uses the accumulated data DB 23 to restore the message. Specifically, if the transmission data received by the communication controller 31 is the specific character and the accumulated data ID, the message restoration unit 32A reads the fixed message 43c in association with the accumulated data ID from the accumulated data DB 23. The message restoration unit 32A then inserts the specific character included in the transmission data into the parameter indicated in the fixed message 43c thus read to restore the message. Subsequently, the message restoration unit 32A outputs the message thus restored to the message log management unit 33.

If the transmission data includes the message itself, the message similarity determination unit 32B determines the similarity between the message and the retained data stored in the retained data storage unit 22 using a predetermined proportion. Specifically, the message similarity determination unit 32B determines whether the message included in the transmission data is identical to any of the retained data stored in the retained data storage unit 22 by the predetermined proportion or more. If the message similarity determination unit 32B determines that the message included in the transmission data is identical to any of the retained data stored in the retained data storage unit 22 by the predetermined proportion or more, the message similarity determination unit 32B determines the message to be a similar message. The message similarity determination unit 32B then generates accumulated data including the string of the identical section, and stores the accumulated data thus generated in the accumulated data DB 23 to update the accumulated data DB 23.

If the message similarity determination unit 32B determines that the message included in the transmission data is identical to none of the retained data stored in the retained data storage unit 22 by the predetermined proportion or more, the message similarity determination unit 32B determines the message not to be a similar message. The message similarity determination unit 32B then stores the message included in the transmission data in the retained data storage unit 22. Subsequently, the message similarity determination unit 32B outputs the message included in the transmission data to the message log management unit 33.

More specifically, the message similarity determination unit 32B generates a string obtained by excluding the specific character from the string indicated in the message included in the transmission data. Furthermore, the message similarity determination unit 32B generates a string obtained by excluding the specific character from the string indicated in the retained data stored in the retained data storage unit 22. The message similarity determination unit 32B then determines that whether the strings thus generated are identical to each other by the predetermined proportion or more. If the message similarity determination unit 32B determines that the message included in the transmission data is identical to any of the retained data stored in the retained data storage unit 22 by the predetermined proportion or more, the message similarity determination unit 32B determines the message to be a similar message. The message similarity determination unit 32B then converts the section corresponding to the specific character in the string indicated in the message included in the transmission data into a parameter to generate a fixed message. The message similarity determination unit 32B then assigns an identification number in association with the fixed message thus generated as an accumulated data ID such that the identification number is not common to other numbers. Subsequently, the message similarity determination unit 32B stores the accumulated data ID thus assigned and the fixed message in association with each other in the accumulated data DB 23, and updates the accumulated data DB 23.

The predetermined proportion is 80%, for example. However, it is not limited thereto, and a proportion by which the messages are determined to be similar may be used. As the method for determining whether the messages are identical to each other by the predetermined proportion or more, for example, an O(ND) algorithm using an edit graph can be applied. Because the data structure of the accumulated data DB 23 is the same as that of the accumulated data DB 43 included in the monitoring target device 3A, the explanation thereof will be omitted.

The accumulated data difference distribution unit 32C distributes difference of the accumulated data between the accumulated data DB 23 thus updated, and the accumulated data DB 43 of the monitoring target device 3A to the monitoring target device 3A. Specifically, the accumulated data difference distribution unit 32C distributes the accumulated data newly updated during the time period between the distribution last time and the distribution this time to the monitoring target device 3A as difference of the accumulated data. Note that the difference of the accumulated data is distributed at predetermined regular time intervals, or at predetermined irregular time intervals. However, it may be distributed at any time, which is not specified in advance.

The message log management unit 33 stores the message restored by the message restoration unit 32A in the message log DB 21 as a message log. Furthermore, the message log management unit 33 stores the message output by the message similarity determination unit 32B in the message log DB 21 as a message log. The message log DB 21 stores therein the message log in association with the monitoring target device 3A that is the generation source of the message. Referring to the message log from the message log DB 21 regularly or irregularly allows the monitoring client 4 to monitor the monitoring target device 3A.

Process of the Monitoring Target Device According to the Second Embodiment

A processing process of the monitoring target device 3A according to the second embodiment will now be explained with reference to FIG. 5. FIG. 5 is a flowchart illustrating the processing process of the monitoring target device 3A according to the second embodiment.

First, the new message acquiring unit 51 uses the message storage unit 41 to wait for a new message (Step S11). The new message acquiring unit 51 determines whether a predetermined timer time has passed (Step S12). If the new message acquiring unit 51 determines that the predetermined timer time has passed (YES at Step S12), the communication controller 53 determines whether there is difference of the accumulated data transmitted from the monitoring device 2A (Step S13).

If the communication controller 53 determines that there is difference of the accumulated data (PRESENT at Step S13), the accumulated data difference updating unit 52B acquires the accumulated data via the communication controller 53, and updates the accumulated data DB 43 with the accumulated data thus acquired (Step S14). Subsequently, the accumulated data difference updating unit 52B goes to Step S15 so as to detect a new message.

By contrast, if the communication controller 53 determines that there is no difference of the accumulated data (ABSENT at Step S13), the accumulated data difference updating unit 52B goes to Step S15 so as to detect a new message.

If the new message acquiring unit 51 determines that the predetermined timer time has not passed yet (NO at Step S12), the accumulated data difference updating unit 52B goes to Step S15 so as to detect a new message. The new message acquiring unit 51 uses the message storage unit 41 to determine detection of a new message (Step S15). If the new message acquiring unit 51 does not detect a new message (NO at Step S15), the processing is finished. By contrast, if the new message acquiring unit 51 detects a new message (YES at Step S15), the new message acquiring unit 51 acquires the new message from the message storage unit 41 (Step S16).

Subsequently, the message consistency determination unit 52A compares the new message acquired by the new message acquiring unit 51 with the fixed message 43c stored in the accumulated data DB 43 (Step S17). The message consistency determination unit 52A then determines whether the new message is identical to the fixed message 43c stored in the accumulated data DB 43 (Step S18). Specifically, the message consistency determination unit 52A determines whether the string indicated in the new message includes the string created from the fixed message 43c.

If the message consistency determination unit 52A determines that the new message is identical to the fixed message 43c stored in the accumulated data DB 43 (YES at Step S18), the message consistency determination unit 52A acquires the search result (Step S19). Specifically, if the message consistency determination unit 52A determines that the string indicated in the new message includes the string created from fixed message 43c, the message consistency determination unit 52A determines that the messages are identical to each other. The message consistency determination unit 52A then acquires the accumulated data searched from the accumulated data DB 43.

Subsequently, the message consistency determination unit 52A constructs the accumulated data ID 43a included in the accumulated data and a variable parameter of the new message as transmission data (Step S20). Specifically, the message consistency determination unit 52A extracts the specific character corresponding to the parameter indicated in the fixed message 43c from the string indicated in the new message. The message consistency determination unit 52A then constructs the specific character thus extracted and the accumulated data ID 43a in association with the fixed message 43c as the transmission data. At this time, the transmission data includes the generation source host name indicating the device itself. The message consistency determination unit 52A then requests the communication controller 53 to transmit the transmission data thus constructed to the monitoring device 2A (Step S22). The communication controller 53 then transmits the transmission data of the content in accordance with the transmission request. Subsequently, the process goes to Step S11.

By contrast, if the message consistency determination unit 52A determines that the new message is not identical to the fixed message 43c stored in the accumulated data DB 43 (NO at Step S18), the message consistency determination unit 52A constructs the new message itself as transmission data (Step S21). At this time, the transmission data includes the generation source host name indicating the device itself. The message consistency determination unit 52A then requests the communication controller 53 to transmit the transmission data thus constructed to the monitoring device 2A (Step S22). The communication controller 53 transmits the transmission data of the content in accordance with the transmission request. Subsequently, the process goes to Step S11.

Processing of the Monitoring Device According to the Second Embodiment

Figure 6:
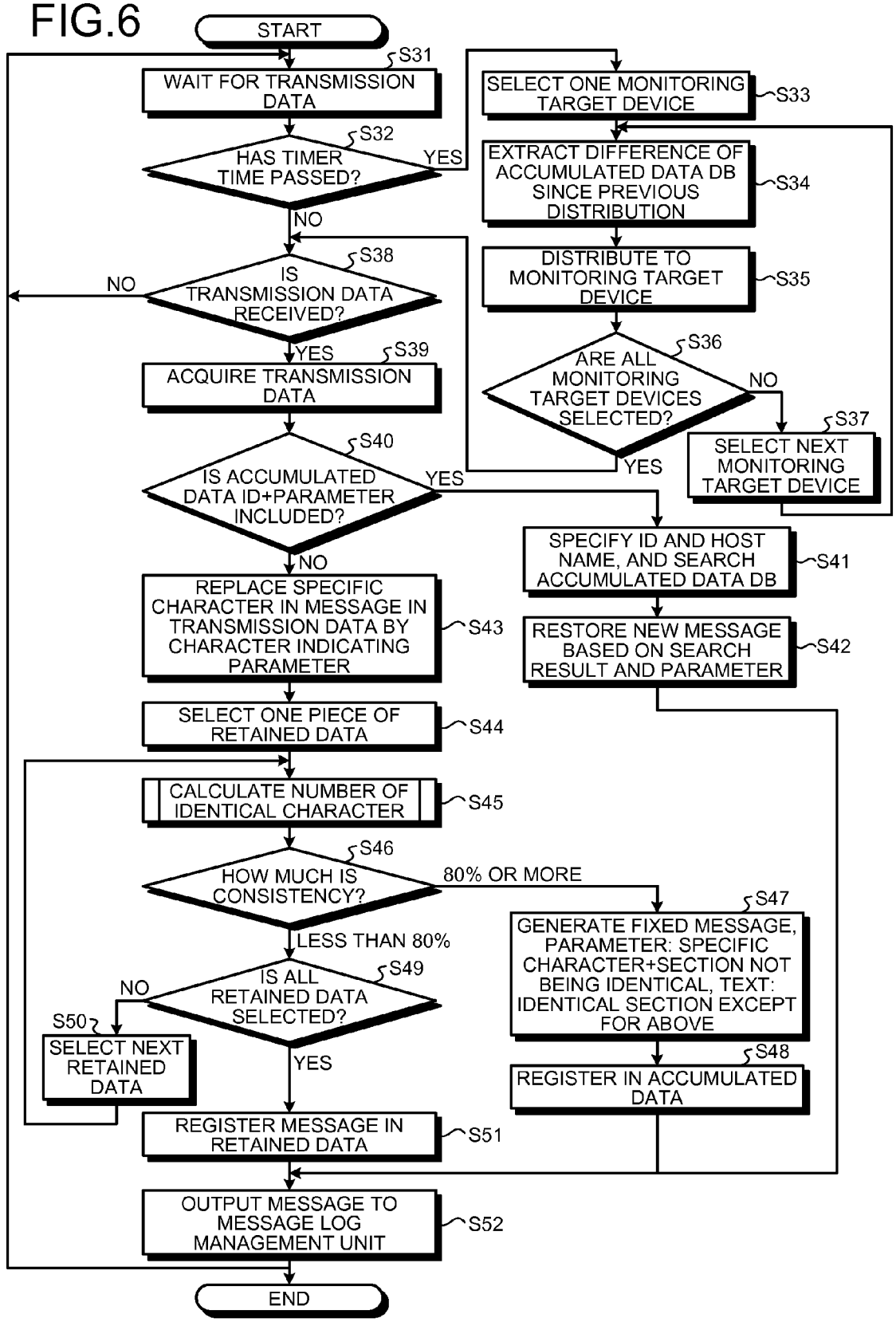
FIG. 6 is a flowchart illustrating a processing process of a monitoring device according to the second embodiment.

A processing process of the monitoring device 2A according to the second embodiment will now be explained with reference to FIG. 6. FIG. 6 is a flowchart illustrating the processing process of the monitoring device according to the second embodiment.

First, the communication controller 31 waits for the transmission data transmitted from the monitoring target device 3A (Step S31). The communication controller 31 determines whether a predetermined timer time has passed (Step S32). If the communication controller 31 determines that the predetermined timer time has passed (YES at Step S32), the accumulated data difference distribution unit 32C selects one monitoring target device 3A from the plurality of monitoring target devices 3A (Step S33).

The accumulated data difference distribution unit 32C extracts difference of the accumulated data stored in the accumulated data DB 23 during the time period between the distribution last time and the distribution this time for the monitoring target device 3A thus selected (Step S34). The accumulated data difference distribution unit 32C then distributes the difference of the accumulated data thus extracted to the monitoring target device 3A thus selected (Step S35). The accumulated data difference distribution unit 32C determines whether all the monitoring target devices 3A are selected (Step S36).

If the accumulated data difference distribution unit 32C determines that all the monitoring target devices 3A are not selected yet (NO at Step S36), the accumulated data difference distribution unit 32C selects the next monitoring target device 3A (Step S37), and goes to Step S34. By contrast, if the accumulated data difference distribution unit 32C determines that all the monitoring target devices 3A are selected (YES at Step S36), the accumulated data difference distribution unit 32C goes to Step S38.

If the predetermined timer time has not passed yet (NO at Step S32), or if all the monitoring target devices 3A are selected (YES at Step S36), the communication controller 31 determines whether transmission data is received (Step S38). If the communication controller 31 determines that no transmission data is received (NO at Step S38), the communication controller 31 goes to Step S31.

By contrast, if the communication controller 31 determines that transmission data is received (YES at Step S38), the communication controller 31 acquires the transmission data (Step S39). Subsequently, the communication controller 31 determines whether the transmission data includes the specific character corresponding to the parameter in the fixed message, and the accumulated data ID (Step S40).

If the transmission data includes the specific character corresponding to the parameter, and the accumulated data ID (YES at Step S40), the message restoration unit 32A specifies the accumulated date ID and the generation source host name in the transmission data, and searches the accumulated date DB 23 for the accumulated data (Step S41). The message restoration unit 32A then restores the new message based on the accumulated data, which is the search result, and the specific character corresponding to the parameter (Step S42). In other words, the message restoration unit 32A inserts the specific character corresponding to the parameter into the parameter indicated in the fixed message in the accumulated data, and thus restores the message. The message restoration unit 32A then goes to Step S52.

If the transmission data includes no specific character corresponding to a parameter, and no accumulated data ID (NO at Step S40), the message similarity determination unit 32B replaces the specific character indicated in the message in the transmission data by a character indicating a parameter (parameter character) (Step S43). Note that the case where the transmission data includes no specific character corresponding to a parameter, and no accumulated data ID means a case where the transmission data includes the message itself.

Subsequently, the message similarity determination unit 32B selects one piece of retained data stored in the retained data storage unit 22 (Step S44). The message similarity determination unit 32B then calculates the number of identical characters between the string obtained by excluding the specific character from the retained data thus selected, and the string obtained by excluding the parameter character from the message in which the specific character is replaced by the parameter character (Step S45). The calculation of the number of identical characters between the strings will be described later in detail.

The message similarity determination unit 32B uses the number of identical characters thus calculated to determine whether the strings are identical to each other by a predetermined proportion (e.g., 80%) or more (Step S46). If the message similarity determination unit 32B determines that the strings are identical to each other by 80% or more (80% OR MORE at Step S46), the message similarity determination unit 32B determines the message to be a similar message. The message similarity determination unit 32B then replaces the section that not being identical to that of the retained data by a parameter character in the message obtained by replacing the specific character by the parameter character, and thus generates a fixed message (Step S47).

The message similarity determination unit 32B then assigns the accumulated data ID in association with the fixed message thus generated, and registers the accumulated data ID, the generation source host name, and the fixed message thus generated in association with one another in the accumulated data DB 23 (Step S48). Subsequently, the message similarity determination unit 32B goes to Step S52.

If the message similarity determination unit 32B determines that the strings are identical to each other by less than 80% (LESS THAN 80% at Step S46), the message similarity determination unit 32B determines the message not to be a similar message. The message similarity determination unit 32B then determines whether all the retained data stored in the retained data storage unit 22 is selected (Step S49). If the message similarity determination unit 32B determines that all the retained data is not selected yet (NO at Step S49), the message similarity determination unit 32B selects the next retained data (Step S50). Subsequently, the message similarity determination unit 32B goes to Step S45 so as to calculate the number of identical characters with the retained data thus selected.

By contrast, if the message similarity determination unit 32B determines that all the retained data is selected (YES at Step S49), the message similarity determination unit 32B registers the message included in the transmission data in the retained data storage unit 22 as retained data (Step S51). The message similarity determination unit 32B then outputs the message included in the transmission data to the message log management unit 33 (Step S52), and goes to Step S31.

Calculation Processing of the Number of Identical Characters

An example of calculation processing of the number of identical characters between the strings illustrated at Step S45 in FIG. 6 will now be explained. Note that the calculation processing of the number of identical characters between the strings is processing using, for example, "an O(ND) algorithm for calculating the longest common subsequence (LCS) based on an edit graph", which is an existing technology.

The concept of the calculation processing of the number of identical characters between the strings will now be explained with reference to FIGS. 7A to 7F. FIGS. 7A to 7F are diagrams for explaining the concept of the calculation processing of the number of identical characters between the strings. As illustrated in FIG. 7A, a first string is "ABCAEFGAF" set in an A(i) array ($1 \leq i \leq 9$), whereas a second string is "BCAFGGAFFAF" set in a B(j) array ($1 \leq j \leq 11$).

As illustrated in FIG. 7B, comparison results of the characters between A(i) and B(j) are indicated by a comparison table of a two-dimensional array C(i,j). If the characters are identical to each other as a comparison result, "1" is set thereto, whereas if the characters are not identical to each other as a comparison result, "0" is set thereto. For example, as for the character "B" of B(1) represented by a reference numeral C1, because the character of A(2) is identical to "B", "1" is set to C(2,1). Because other characters are not identical to "B", "0" is set to C(i,1) ($i \neq 2$).

As illustrated in FIG. 7C, an edit graph is generated from the comparison table C(i,j). The edit graph is obtained by: arranging the characters of the strings A(i) and B(j) on the x-axis and the y-axis, respectively; connecting intersections thereof with the horizontal and vertical sides; and drawing a segment from (x−1,y−1) to (x,y) only when the x-th character of A and the y-th character of B are identical to each other. When the string A(i) is arranged on the x-axis, and the string B(j) is arranged on the y-axis, the edit graph having segments S1 to S12 is generated. Note that the explanation will be made with an assumption that (x−1,y−1) is represented by ($x_1,y_1$), and (x,y) is represented by ($x_2,y_2$). Furthermore, if segments are connected, the beginning of the segments is represented by ($x_1,y_1$), and the end of the continuous segments is represented by ($x_2,y_2$).

As illustrated in FIG. 7D, a position and the number of continuous identical characters are extracted from the edit graph for each segment. For example, in the case of the segment S1, ($x_1,y_1$) is (1,0), ($x_2,y_2$) is (4,3), and the number of continuous identical characters (continuous identical character number) L is 3.

As illustrated in FIG. 7E, a relational table between the segments is generated. In other words, other segments that are selectable simultaneously with each segment are extracted. A higher array used herein means a segment (string) that is selectable prior to each segment, and a lower array used herein means a segment (string) that is selectable posterior to each segment. For example, in the case of the segment S3, segments that are selectable prior thereto are S1 and S2, and segments that are selectable posterior thereto are S8 and S11.

As illustrated in FIG. 7F, a route in which the number of identical characters is the maximum is searched using the relational table between the segments. For example, in the route of S1, S3, and S8 in order of precedence, the number of identical characters is 6, and in the route of S1, S3, and S11, the number of identical characters is 7. Furthermore, in the route of S1 and S4, the number of identical characters is 6, and in the route of S1, S6, and S11, the number of identical characters is 6. Therefore, it is obvious that the route of S1, S3, and S11 makes the number of identical characters the maximum.

Figure 8A:
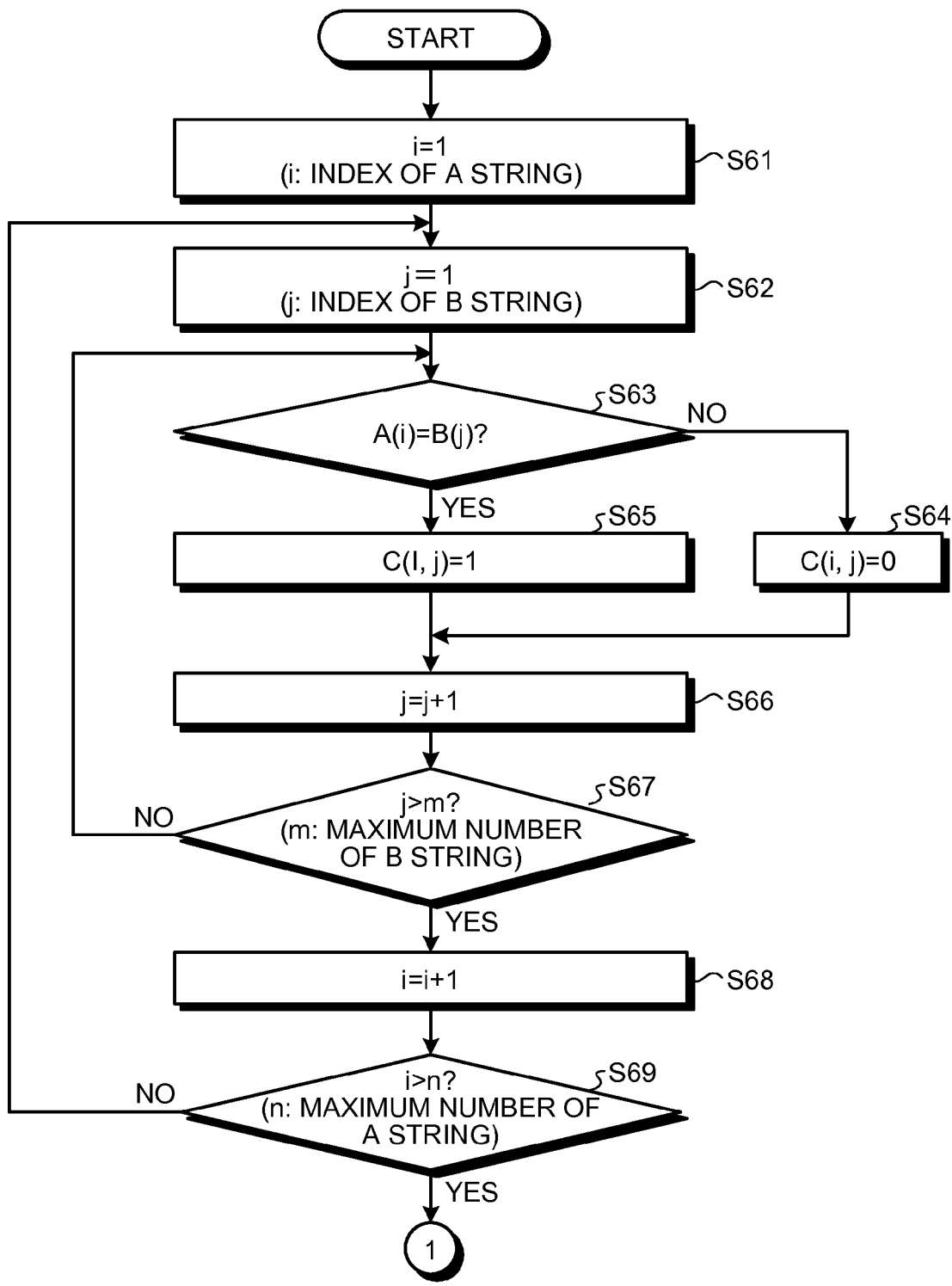
FIG. 8A is a flowchart illustrating a process of calculation of the number of identical characters.
Figure 8B:
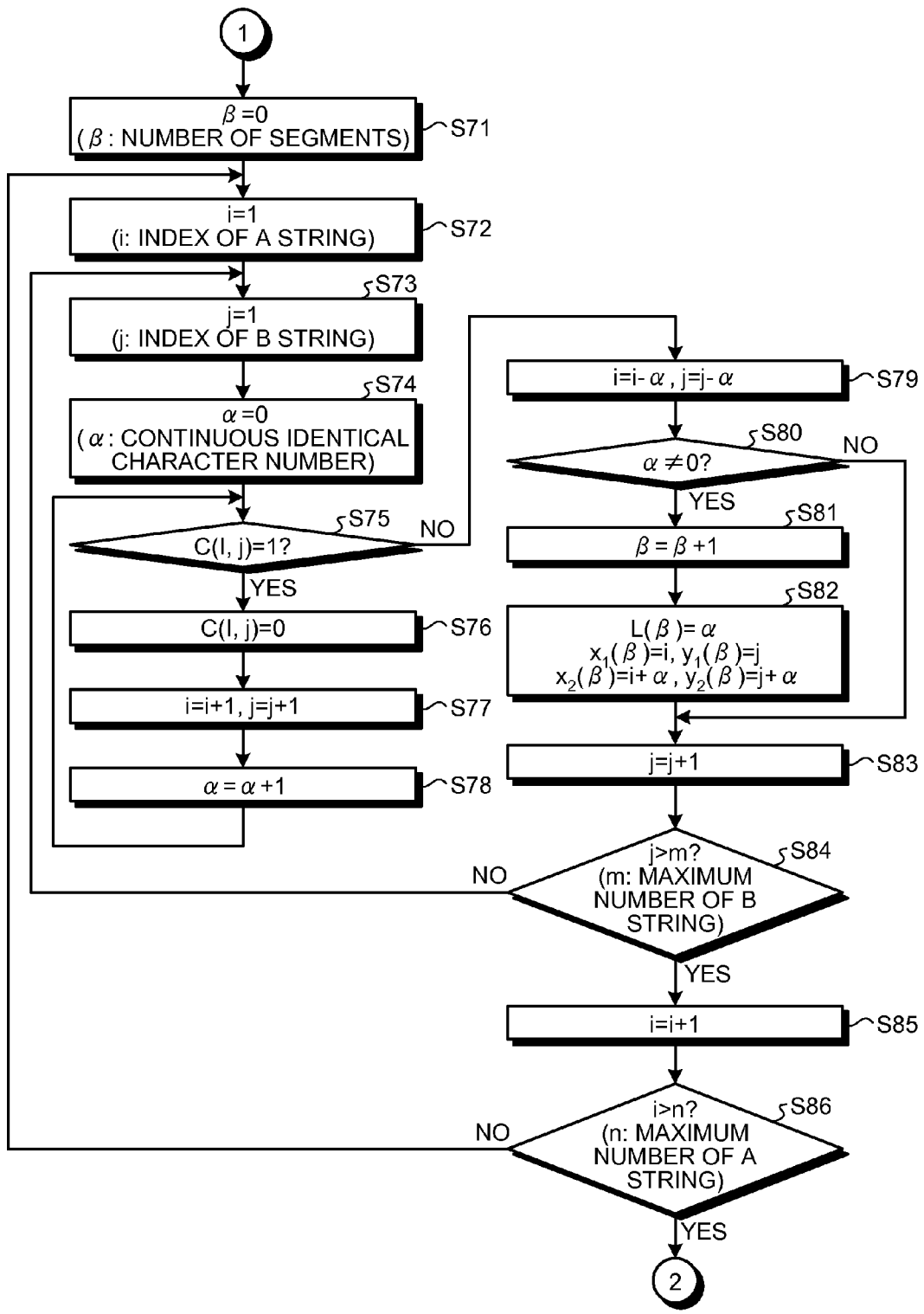
FIG. 8B is a flowchart illustrating a processing process for extracting a position and the like for each segment from an edit graph.
Figure 8D:
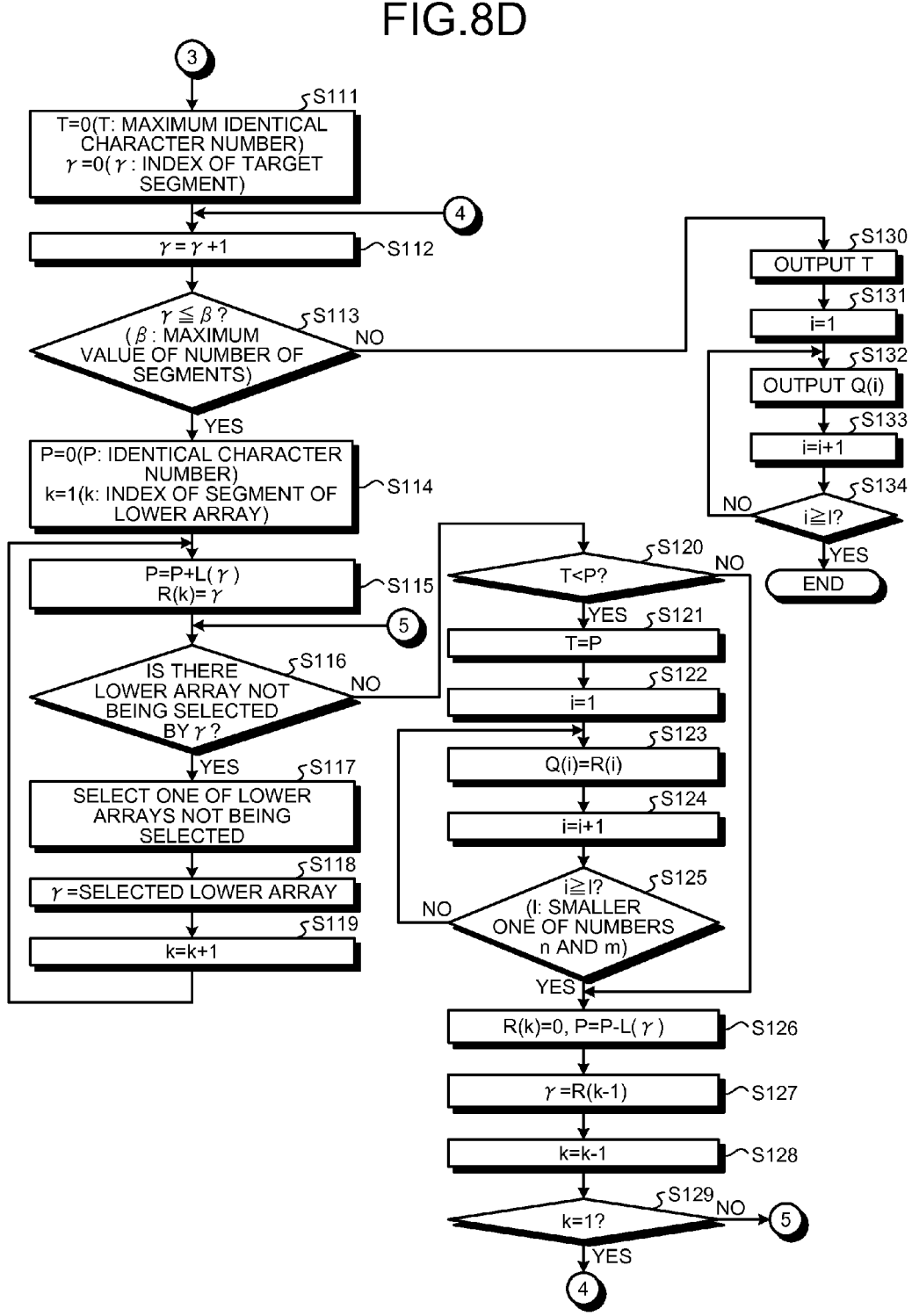
FIG. 8D is a flowchart illustrating a route search processing process using the relational table between the segments.

FIG. 8A to FIG. 8D are flowcharts illustrating a process of the calculation processing of the number of identical characters. FIG. 8A illustrates the processing process for converting the comparison results between the strings of A(i) and B(j) into the comparison table of the two-dimensional array C(i,j). FIG. 8B illustrates the processing process for generating the edit graph from the comparison table, and extracting a position and the like for each segment from the edit graph. FIG. 8C illustrates the processing process for generating the relational table between the segments. FIG. 8D illustrates the route search processing process using the relational table between the segments. The explanation will be made with an assumption that the two strings are set in the array A(i) ($1 \leq i \leq n$), and the array B(j) ($1 \leq j \leq m$), respectively. Note that i, j, n, and m are natural numbers.

First, the message similarity determination unit 32B sets 1 to an index i of the A string and an index j of the B string (Steps S61 and S62). The message similarity determination unit 32B then determines whether the character of A(i) is identical to the character of B(j) (Step S63). If the character of A(i) is not identical to the character of B(j) (NO at Step S63), the message similarity determination unit 32B sets "0" to the two-dimensional array C(i,j), which is the comparison result between the characters (Step S64).

By contrast, if the character of A(i) is identical to the character of B(j) (YES at Step S63), the message similarity determination unit 32B sets "1" to C(i,j) (Step S65). The message similarity determination unit 32B then adds 1 to the index j (Step S66), and determines whether the index j is larger than the maximum number m of the B string (Step S67). If the index j is equal to or smaller than the maximum number m of the B string (NO at Step S67), the message similarity determination unit 32B goes to step S63.

By contrast, if the index j is larger than the maximum number m of the B string (YES at Step S67), the message similarity determination unit 32B adds 1 to the index i (Step S68), and determines whether the index i is larger than the maximum number n of the A string (Step S69). If the index i is equal to or smaller than the maximum number n of the A string (NO at Step S69), the message similarity determination unit 32B goes to Step S62. By contrast, if the index i is larger than the maximum number n of the A string (YES at Step S69), the message similarity determination unit 32B goes to Step S71 illustrated in FIG. 8B.

FIG. 8B is a flowchart illustrating the processing process for extracting a position and the like for each segment from the edit graph. First, the message similarity determination unit 32B sets "0" to initialize the number of segments β (Step S71). The message similarity determination unit 32B sets 1 to the index i of the A string and the index j of the B string (Steps S72 and S73), and sets "0" to initialize a continuous identical character number α (Step S74).

The message similarity determination unit 32B then determines whether C(i,j) is 1 (Step S75). If C(i,j) is 1 (YES at Step S75), the message similarity determination unit 32B sets "0" to C(i,j) (Step S76), adds 1 to the index i and the index j (Step S77), and adds 1 to the continuous identical character number α (Step S78). Subsequently, the message similarity determination unit 32B goes to Step S75.

By contrast, if C(i,j) is not 1 (NO at Step S75), the message similarity determination unit 32B subtracts the continuous identical character number α from the index i and the index j (Step S79). The message similarity determination unit 32B then determines whether the continuous identical character number α is "0" (Step S80). If the continuous identical character number α is "0" (NO at Step S80), the message similarity determination unit 32B goes to Step S83. By contrast, if the continuous identical character number α is not "0" (YES at Step S80), the message similarity determination unit 32B determines that the segment is a segment for identical characters, and adds 1 to the number of segments β (Step S81). The message similarity determination unit 32B then sets α to the continuous identical character number $L(\beta)$, sets the index to $x_1(\beta)$, and sets the index j to $y_1(\beta)$, and sets an index i+α to $x_2(\beta)$, and sets an index j+α to $y_2(\beta)$ (Step S82).

The message similarity determination unit 32B then adds 1 to the index j (Step S83), and determines whether the index j is larger than the maximum number m of the B string (Step S84). If the index j is equal to or smaller than the maximum number m of the B string (NO at Step S84), the message similarity determination unit 32B goes to step S74.

By contrast, if the index j is larger than the maximum number m of the B string (YES at Step S84), the message similarity determination unit 32B adds 1 to the index i (Step S85), and determines whether the index i is larger than the maximum number n of the A string (Step S86). If the index i is equal to or smaller than the maximum number n of the A string (NO at Step S86), the message similarity determination unit 32B goes to Step S73. By contrast, if the index i is larger than the maximum number n of the A string (YES at Step S86), the message similarity determination unit 32B goes to Step S91 illustrated in FIG. 8C.

FIG. 8C is a flowchart illustrating the processing process for generating the relational table between the segments. First, the message similarity determination unit 32B sets "1" to an index γ indicating a target segment, and sets "1" to an index γ' indicating a segment (Steps S91 and S92). The message similarity determination unit 32B then determines whether the index γ is identical to the index γ' (Step S93). If the index γ is not identical to the index γ' (YES at Step S93), the message similarity determination unit 32B determines to search the relationship between the target segment of the index γ and the segment of the index γ'. The message similarity determination unit 32B determines whether a beginning position $x_1(\gamma)$ of the target segment of γ is equal to or larger than a beginning position $x_1(\gamma')$ of the segment of γ', and whether a beginning position $y_1(\gamma)$ of the target segment of γ is equal to or larger than a beginning position $y_1(\gamma')$ of the segment of γ' (Step S94).

If $x_1(\gamma)$ is equal to or larger than $x_1(\gamma')$, and $y_1(\gamma)$ is equal to or larger than $y_1(\gamma')$ (YES at Step S94), the message similarity determination unit 32B stores the segment of the index γ' in the relational table between the segments as a higher array of the target segment of the index γ (Step S95). By contrast, if $x_1(\gamma)$ is not equal to or larger than $x_1(\gamma')$, and $y_1(\gamma)$ is not equal to or larger than $y_1(\gamma')$ (NO at Step S94), the message similarity determination unit 32B determines whether $x_2(\gamma)$ is equal to or smaller than $x_2(\gamma')$, and whether $y_2(\gamma)$ is equal to or smaller than $y_2(\gamma')$ (Step S96). If $x_2(\gamma)$ is equal to or smaller than $x_2(\gamma')$, and $y_2(\gamma)$ is equal to or smaller than $y_2(\gamma')$ (YES at Step S96), the message similarity determination unit 32B stores the segment of the index γ' in the relational table between the segments as a lower array of the target segment of the index γ (Step S97). By contrast, if $x_2(\gamma)$ is not equal to or smaller than $x_2(\gamma')$, and $y_2(\gamma)$ is not equal to or smaller than $y_2(\gamma')$ (NO at Step S96), the message similarity determination unit 32B goes to Step S98.

After the processing of Step S95 or the Step S97, the message similarity determination unit 32B stores the continuous identical character number $L(\gamma)$ of the index γ in the relational table between the segments (Step S98). The message similarity determination unit 32B then adds 1 to the index γ' indicating the segment (Step S99), and determines whether the index γ' is equal to or smaller than the maximum value β of the number of segments (Step S100). If the index γ' is equal to or smaller than the maximum value β of the number of segments (YES at Step S100), the message similarity determination unit 32B goes to Step S93.

By contrast, if the index γ' is larger than the maximum value β of the number of segments (NO at Step S100), the message similarity determination unit 32B adds 1 to the index γ (Step S101), and determines whether the index γ is equal to or smaller than the maximum value β of the number of segments (Step S102). If the index γ is equal to or smaller than the maximum value β of the number of segments (YES at Step S102), the message similarity determination unit 32B goes to Step S92. By contrast, if the index γ is larger than the maximum value β of the number of segments (NO at Step S102), the message similarity determination unit 32B goes to Step S111 illustrated in FIG. 8D.

FIG. 8D is a flowchart illustrating the route search processing process using the relational table between the segments. First, the message similarity determination unit 32B sets "0" to initialize a maximum identical character number T and the index γ indicating the target segment (Step S111). The message similarity determination unit 32B then adds 1 to the index γ (Step S112), and determines whether the index γ is equal to or smaller than the maximum value β of the number of segments (Step S113).

If the index γ is equal to or smaller than the maximum value β of the number of segments (YES at Step S113), the message similarity determination unit 32B sets "0" to an identical character number P. Furthermore, the message similarity determination unit 32B sets "1" to k indicating the index of an array R that retains an index indicating a segment having identical characters (Step S114). The message similarity determination unit 32B then adds the continuous identical character number $L(\gamma)$ of the index γ indicating the segment to the identical character number P, and sets the value of the index γ indicating the segment to the array R(k) (Step S115).

The message similarity determination unit 32B determines whether there is a lower array that is not selected by the index γ indicating the segment based on the relational table between the segments (Step S116). If there is a lower array that is not selected by the index γ (YES at Step S116), the message similarity determination unit 32B selects one of the lower arrays that are not selected (Step S117), and sets the index γ to the selected lower array (Step S118). The message similarity determination unit 32B then adds 1 to k indicating the index of the array R (Step S119), and goes to Step S115.

By contrast, if there is no lower array that is not selected by the index γ indicating the segment (NO at Step S116), the message similarity determination unit 32B determines that the route search for one route from the target segment is completed. The message similarity determination unit 32B then determines whether the maximum identical character number T in the previous route searches is smaller than the identical character number P indicating the result of this route search (Step S120). If the maximum identical character number T in the previous route searches is smaller than the identical character number P indicating the result of this route search (YES at Step S120), the message similarity determination unit 32B sets the identical character number P indicating the result of this route search to the maximum identical character number T (Step S121). The message similarity determination unit 32B then copies the array R that retains an index indicating a segment having identical characters to an array Q (Steps S122 to S125). By contrast, if the maximum identical character number T in the previous route searches is equal to or larger than the identical character number P indicating the result of this route search (NO at Step S120), the message similarity determination unit 32B goes to Step S126 so as to search the next route.

The message similarity determination unit 32B clears information about the index γ indicating the segment selected most recently so as to return to the previous route. The message similarity determination unit 32B sets "0" to the array R(k), subtracts the continuous identical character number L(γ) of the segment γ selected most recently from the identical character number P (Step S126), and sets R(k−1) indicating the segment selected at the previous time to the value of the segment γ (Step S127). Furthermore, the message similarity determination unit 32B subtracts 1 from k indicating the index of the array R (Step S128).

The message similarity determination unit 32B then determines whether k on which the subtraction is performed is "1" (Step S129). If k is "1" (YES at Step S129), the message similarity determination unit 32B goes to Step S112 so as to search the route related to the next target segment. By contrast, if k is not "1" (NO at Step S129), the message similarity determination unit 32B goes to Step S116 so as to search other routes related to the target segment this time.

If the index γ exceeds the maximum value β of the number of segments (NO at Step S113), the message similarity determination unit 32B outputs the maximum identical character number T (Step S130). The message similarity determination unit 32B then outputs the index indicating the segment having identical characters retained in the array Q (Steps S131 to S134), and finishes the calculation processing of the identical character number.

Advantageous Effects of the Second Embodiment

According to the second embodiment, when the strings each indicated in the first data and the second data are identical to each other by the predetermined proportion or more, the monitoring device 2A generates the accumulated data including the string of the identical section and the data ID. The first data and the second data are acquired by the monitoring device 2A through communications with the plurality of monitoring target devices 3A. The monitoring device 2A then updates the accumulated data DB 23 with the accumulated data thus generated, and distributes the accumulated data thus updated to the monitoring target device 3A as difference of the accumulated data. The monitoring target device 3A then acquires the accumulated data distributed from the monitoring device 2A, and updates the accumulated data DB 43 included in the device itself with the accumulated data. When the string indicated in the new data includes the string indicated in the accumulated data with which the accumulated data DB 43 is updated, the monitoring target device 3A generates the data indicating the string obtained by excluding the string indicated in the accumulated data from the string indicated in the new data. The monitoring target device 3A then transmits the transmission data including the data thus generated and the data ID for identifying the accumulated data to the monitoring device 2A.

With this configuration, the monitoring device 2A distributes the accumulated data including the string of the section in which the strings each indicated in the first data and the second data are identical to each other by the predetermined proportion or more, and the data ID to the plurality of monitoring target devices 3A. Therefore, the monitoring target device 3A uses the accumulated data distributed from the monitoring device 2A for comparison with the string indicated in the new data, thereby making it possible to transmit the difference between the new data and the accumulated data alone to the monitoring device 2A as the new data. As a result, the monitoring system 1A can reduce the traffic amount of the new data transmitted from the monitoring target device 3A to the monitoring device 2A.

Figure 9A:
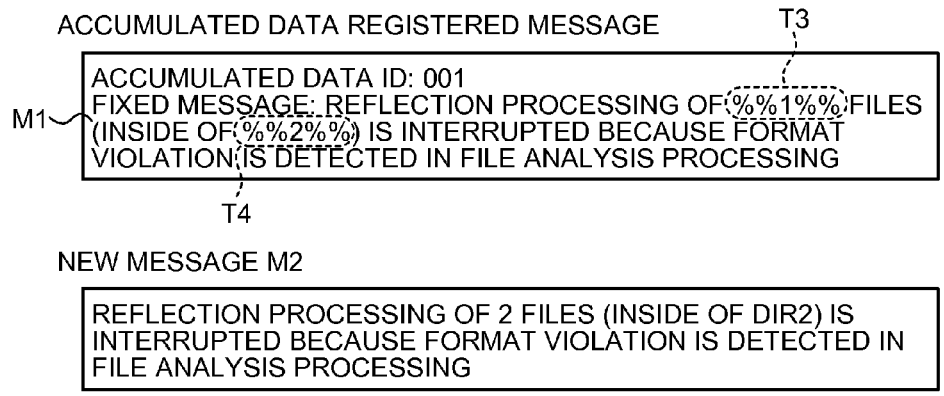
FIGS. 9A to 9C are diagrams for comparing data amounts of the transmission data.
Figure 9B:
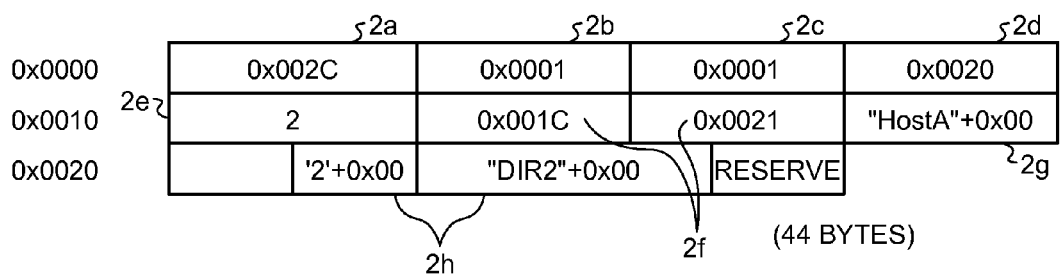
Figure 9C:
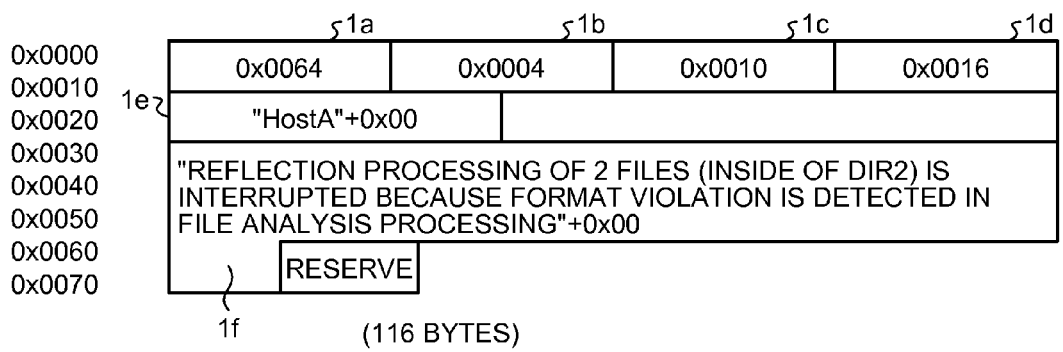

The data amount of the transmission data when the accumulated data DB 43 stores therein accumulated data will be compared with the data amount thereof when the accumulated data DB 43 stores therein no accumulated data. FIGS. 9A to 9C are diagrams for comparing the data amounts of the transmission data. FIG. 9A illustrates accumulated data and a new message, which is new data, for convenience of the explanation. FIG. 9B illustrates transmission data when the accumulated data DB 43 stores therein the accumulated data, and when the string indicated in the new message includes the string created from the fixed message 43c. FIG. 9C illustrates transmission data when the accumulated data DB 43 stores therein no accumulated data, or when the string indicated in the new message does not include the string created from the fixed message 43c.

As illustrated in FIG. 9A, the accumulated data DB 43 stores therein a fixed message M1 of which accumulated data ID 43a is "001". The string indicated in a new message M2 includes the string obtained by excluding parameters T3 and T4 represented as specific characters from the fixed message M1.

As illustrated in FIG. 9B, when the accumulated data DB 43 stores therein accumulated data, the data amount of the transmission data is 44 bytes. By contrast, when the accumulated data DB 43 stores therein no accumulated data, the data amount of the transmission data is 116 bytes.

Therefore, in the example of the new message illustrated in FIG. 9A, when the accumulated data DB 43 stores therein accumulated data, the data amount of the transmission data can be reduced to approximately two-fifths of the data amount thereof when the accumulated data DB 43 stores therein no accumulated data. In other words, the monitoring system 1A can reduce the traffic amount of the new data transmitted from the monitoring target device 3A to the monitoring device 2A.

According to the second embodiment, when receiving the transmission data including the specific character and the data ID for identifying the accumulated data, the monitoring device 2A reads the fixed message in association with the data ID from the accumulated data DB 23. The monitoring device 2A then inserts the specific character included in the transmission data into the parameter indicated in the fixed message thus read. With this configuration, the monitoring device 2A uses the data ID and the specific character included in the transmission data, thereby making it possible to generate new message generated in the monitoring target device 3A efficiently.

In the explanation, the message similarity determination unit 32B determines whether the string obtained by excluding the specific character from the message included in the transmission data, and the string obtained by excluding the specific character from the retained data stored in the retained data storage unit 22 are identical to each other by the predetermined proportion or more. However, it is not limited thereto, and the message similarity determination unit 32B may determine whether the string indicated in the message included in the transmission data, and the string indicated in the retained data stored in the retained data storage unit 22 are identical to each other by a predetermined proportion or more. In this case, the message similarity determination unit 32B converts the section not being identical to that of the retained data into a parameter in the string of the message included in the transmission data, and thus generates a fixed message. Subsequently, the message similarity determination unit 32B may stores the fixed message thus generated together with the accumulated data ID in association with the fixed message in the accumulated data DB 23 as accumulated data. Therefore, if the monitoring device 2A distributes difference of the accumulated data in the accumulated data DB 23 to the plurality of monitoring target devices 3A, it is possible to reduce the traffic amount of the new data transmitted from the monitoring target device 3A to the monitoring device 2A after the distribution.

Program or the Like

The monitoring device 2A can be realized by mounting functions of the communication controller 31, the accumulated data management unit 32, the message log management unit 33, and the like on an information processing apparatus, such as a known personal computer, and a work station. The monitoring target device 3A can be realized by mounting functions of the new message acquiring unit 51, the accumulated data management unit 52, the communication controller 53, and the like on an information processing apparatus, such as a known personal computer, and a work station.

The components of each device thus illustrated are not necessarily configured as illustrated physically. In other words, specific aspects of disintegration and integration in each device are not limited to the illustrated aspects. Each device can be configured by disintegrating and integrating the whole or a part thereof functionally or physically by arbitrary units in accordance with various types of loads, usages, and the like. For example, the message restoration unit 32A and the message similarity determination unit 32B may be integrated as one unit. By contrast, the message similarity determination unit 32B may be disintegrated into a consistency calculation unit that calculates the consistency between the message included in the transmission data and the retained data, and a similarity determination unit that determines whether the message is a similar message based on the consistency. Furthermore, the storage units such as the accumulated data DB 23 and the retained data storage unit 22 may be connected to the monitoring device 2A via a network as external devices of the monitoring device 2A.

Furthermore, the processing units (the new message acquiring unit 51, the accumulated data management unit 52, and the communication controller 53) in the control unit 40 of the monitoring target device 3A may be added to the control unit 20 of the monitoring device 2A, thereby causing the monitoring device 2A to operate as the monitoring target device 3A. By contrast, the processing units (the communication controller 31, the accumulated data management unit 32, and the message log management unit 33) in the control unit 20 of the monitoring device 2A may be added to the control unit 40 of the monitoring target device 3A, thereby causing the monitoring target device 3A to operate as the monitoring device 2A.

Various types of processing explained in the embodiments can be realized by executing a computer program prepared in advance with a computer, such as a personal computer and a work station. An explanation will be made of an example of a computer that executes a monitoring program having the same functions as those of the control unit 20 of the monitoring device 2A illustrated in FIG. 2 with reference to FIG. 10.

Figure 10:
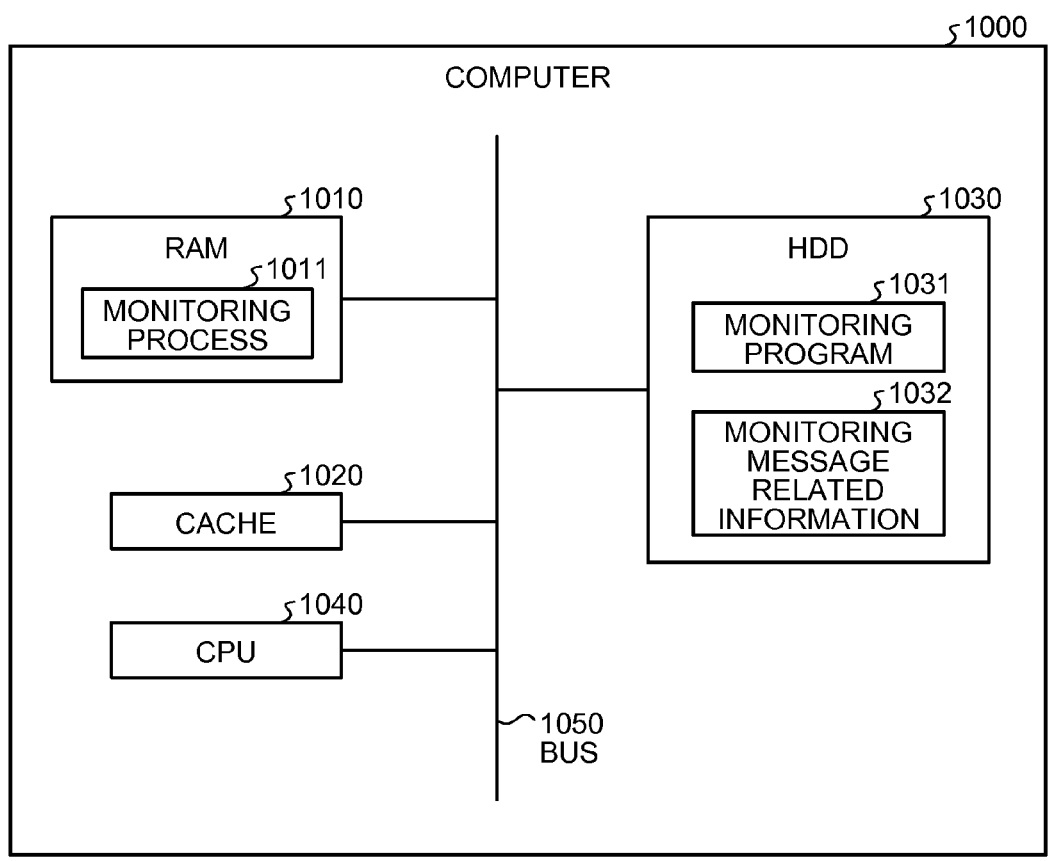
FIG. 10 is a diagram of a computer that executes a monitoring program.

FIG. 10 is a diagram of the computer that executes the monitoring program. As illustrated in FIG. 10, a computer 1000 includes a RAM 1010, a cache 1020, an HDD 1030, a CPU 1040, and a bus 1050. The RAM 1010, the cache 1020, the HDD 1030, and the CPU 1040 are connected with the bus 1050.

The HDD 1030 stores therein a monitoring program 1031 having the same functions as those of the control unit 20 illustrated in FIG. 2. Furthermore, the HDD 1030 stores therein monitoring message related information 1032 corresponding to the message log DB 21, the retained data storage unit 22, and the accumulated data DB 23 illustrated in FIG. 2. The monitoring program 1031 may include a computer program having the same functions as those of the control unit 40 illustrated in FIG. 2. Furthermore, the monitoring message related information 1032 may include data corresponding to the message storage unit 41 and the accumulated data DB 43 illustrated in FIG. 2.

The CPU 1040 reads the monitoring program 1031 from the HDD 1030 to load the monitoring program 1031 into the RAM 1010, whereby the monitoring program 1031 operates as a monitoring process 1011. The monitoring process 1011 then loads information read from the monitoring message related information 1032 or the like into a region allocated for itself on the RAM 1010 arbitrarily, and performs various types of data processing based on the data thus loaded or the like.

The monitoring program 1031 is not necessarily stored in the HDD 1030, and may be executed by reading the monitoring program 1031 stored in a storage medium such as a CD-ROM by the computer 1000. Alternatively, the monitoring program 1031 may be stored in another computer (or a server) connected to the computer 1000 via a public line, the Internet, a local area network (LAN), a wide area network (WAN), or the like. In this case, the computer 1000 reads and executes the monitoring program 1031 from these devices.

With an aspect of the monitoring system disclosed in the present application, it is possible to reduce the network load.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring system comprising:
a plurality of devices, wherein
a first device among the plurality of devices comprises:
a generating unit that, when strings each indicated in first data and second data acquired through communications with the plurality of devices are similar to each other by at least a predetermined proportion, generates third data indicating a string of an identical section of the first data and the second data; and
a first transmitting unit that transmits the third data and information for identifying the third data to a second device included in the plurality of devices, and
the second device comprises:
a second transmitting unit that, when a string indicated in fourth data to be transmitted to the first device includes the string indicated in the third data, transmits fifth data indicating a string obtained by excluding the string indicated in the third data from the string indicated in the fourth data, and the information for identifying the third data to the first device.

2. The monitoring system according to claim 1, wherein the first device further comprising an inserting unit that inserts a string indicated in the fifth data into the string indicated in the third data when the first device receives the fifth data and the information for identifying the third data.

3. A monitoring method for monitoring a plurality of devices by a monitoring system, the monitoring method comprising:

generating, when strings each indicated in first data and second data acquired through communications with the plurality of devices are similar to each other by at least a predetermined proportion, third data indicating a string of an identical section of the first data and the second data;
transmitting the third data and information for identifying the third data to the plurality of devices; and
transmitting, when a string indicated in fourth data to be transmitted to a destination that is any of the plurality of devices includes the string indicated in the third data, fifth data indicating a string obtained by excluding the string indicated in the third data from the string indicated in the fourth data, and the information for identifying the third data to the destination.

4. A non-transitory computer readable medium storing a monitoring program that causes a computer to execute a process, the process comprising:

generating, when strings each indicated in first data and second data acquired through communications with a plurality of devices are similar to each other by at least a predetermined proportion, third data indicating a string of an identical section of the first data and the second data;
transmitting the third data and information for identifying the third data to the plurality of devices; and
transmitting, when a string indicated in fourth data to be transmitted to a destination that is any of the plurality of devices includes the string indicated in the third data, fifth data indicating a string obtained by excluding the string indicated in the third data from the string indicated in the fourth data, and the information for identifying the third data to the destination.

* * * * *